United States Patent
Morimoto et al.

(10) Patent No.: US 6,580,755 B1
(45) Date of Patent: Jun. 17, 2003

(54) APPARATUS AND METHOD FOR ENCODING

(75) Inventors: Hiroyori Morimoto, Kyoto (JP); Akihiro Watabe, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 498 days.

(21) Appl. No.: 09/659,825

(22) Filed: Sep. 11, 2000

(30) Foreign Application Priority Data

Sep. 13, 1999 (JP) .......................................... 11-258302

(51) Int. Cl.⁷ .............................................. H04N 7/12
(52) U.S. Cl. .............................. 375/240.02; 375/240.25
(58) Field of Search ....................... 375/240.02, 240.05, 375/240.1, 240.25, 240.26, 240.29; 348/419.1; 382/236, 238, 239; 386/109, 111; 358/261.2, 430

(56) References Cited

U.S. PATENT DOCUMENTS

| 5,537,440 | A | * | 7/1996 | Eyuboglu et al. ........... 375/245 |
| 5,686,963 | A | * | 11/1997 | Uz et al. ................ 375/240.06 |
| 5,870,146 | A | * | 2/1999 | Zhu ........................ 375/240.03 |
| 6,038,256 | A | * | 3/2000 | Linzer et al. ........... 375/240.12 |
| 6,081,295 | A | * | 6/2000 | Adolph et al. ......... 375/240.03 |
| 6,310,915 | B1 | * | 10/2001 | Wells et al. ............ 375/240.03 |

FOREIGN PATENT DOCUMENTS

| JP | 3-129987 | 6/1991 |
| JP | 5-64143 | 3/1993 |
| JP | 6-54309 | 2/1994 |

OTHER PUBLICATIONS

Meng et al., "Buffer control techniques for compressed-domain video editing", IEEE International Symposium on Circuits and Systems, vol. 2, pp. 600–603, May 1996.*

"The basis of Digital Picture Compression", Nikkei BP Publication Center, pp. 196–200, Jan. 20, 1996 (Partial English Translation).

* cited by examiner

Primary Examiner—Vu Le
(74) Attorney, Agent, or Firm—McDermott, Will & Emery

(57) ABSTRACT

An encoder apparatus transmits encoded data without missing any part of it. The apparatus includes: an encoder for compressing and encoding multiple moving pictures and calculating the number of bits used to obtain encoded data by encoding each said picture to be encoded; original picture data storage for storing the pictures to be encoded thereon; encoded data storage for storing the encoded data thereon; and bit number comparator for obtaining a threshold value of the number of bits available for each said picture to be encoded and determining whether or not the bit number exceeds the threshold value. If the encoder has determined that there will be enough time for the encoder to re-encode a current one of the pictures to be encoded before encoding of a next one of the pictures is started and if the comparator has found the bit number exceeding the threshold value, then the encoder re-encodes the current picture by changing encoding parameters in such a manner as to reduce the bit number.

11 Claims, 10 Drawing Sheets

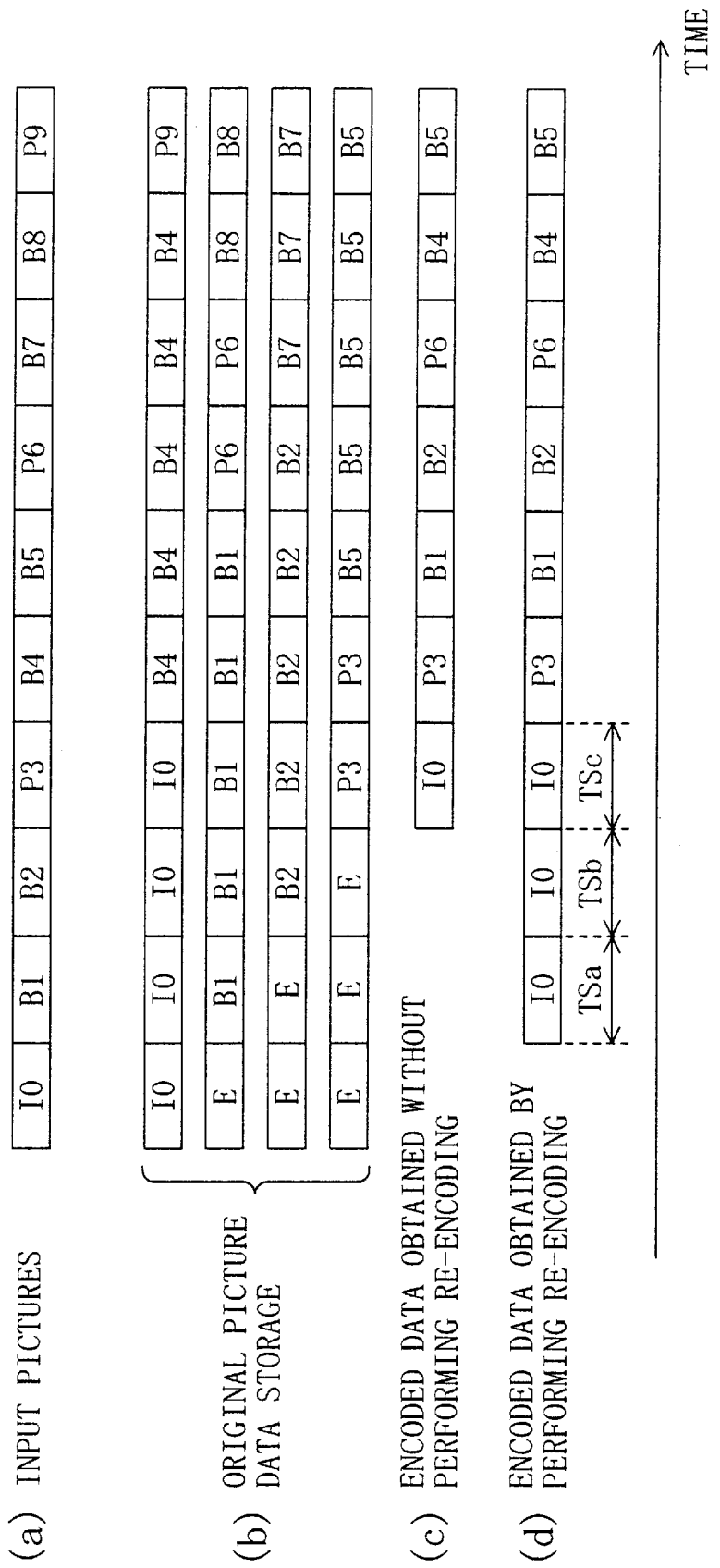

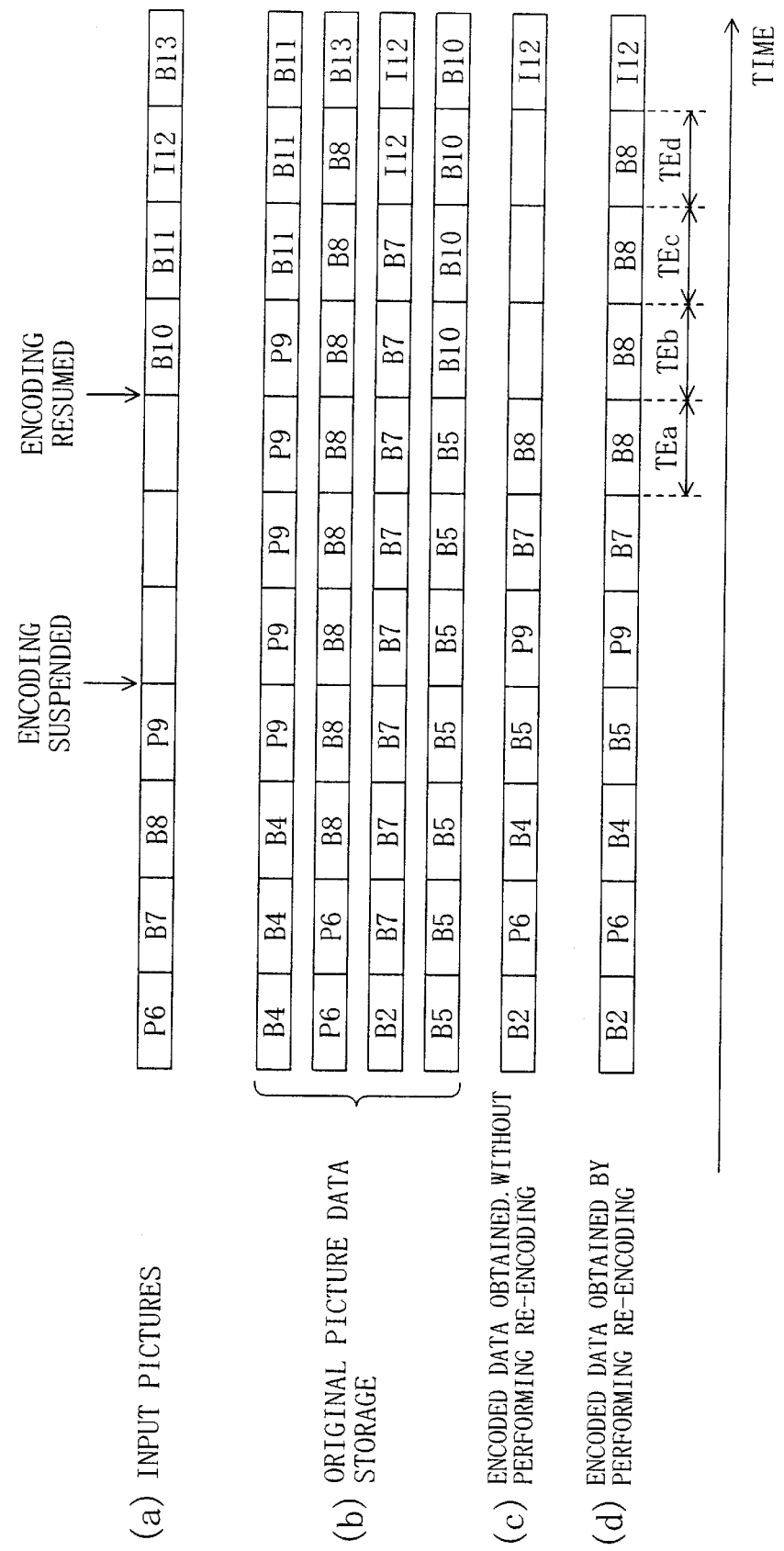

APPARATUS AND METHOD FOR ENCODING

BACKGROUND OF THE INVENTION

The present invention relates to an encoder apparatus for compressing and encoding moving pictures in accordance with an algorithm complying with an MPEG standard.

MPEG standards are known as international video compression standards issued by Moving Picture Experts Group. The MPEG standards define a virtual decoder model (i.e., a video buffering verifier (VBV)) connected to the output of an encoder. This model includes a reception buffer (or a VBV buffer) and the number of bits of encoded data is defined to meet a constraint on the occupancy level of the VBV buffer, i.e., the VBV buffer should neither overflow or underflow.

The VBV buffer is supposed to operate under the following ideal conditions:

(1) The encoder and the VBV buffer should operate completely synchronously with each other; and
(2) Each picture should be decoded instantaneously and encoded data associated with each picture should be removed instantaneously from the VBV buffer.

The occupancy level of the VBV buffer can be obtained by subtracting the cumulative number of bits of the encoded data to be decoded by the decoder (i.e., the encoded data output from the encoder) from that of the data transmitted from the encoder to the decoder through a transmission line.

The overflow of the VBV buffer refers to a state where the occupancy level of the VBV buffer reaches its capacity before the encoded data is removed from the VBV buffer. The underflow of the VBV buffer refers to a state where the occupancy level of the VBV buffer is short of the bit number of the encoded data to be removed from the VBV buffer. The VBV buffer underflows when too large a number of bits are used to encode a picture.

If the VBV buffer has underflowed, then the cumulative bit number of the encoded data output from the encoder is greater than the cumulative bit number of the data transmitted. Thus, it is impossible to transmit all of the encoded data obtained. As a result, the data received at the decoder will miss part of the data needed for decoding. Accordingly, if the underflow is likely to occur, the underflow should be avoided by controlling the encoder in such a manner that a reduced number of bits will be used to encode a picture.

A picture to be encoded is divided into multiple sub-regions called "macroblocks", each consisting of 16×16 pixels. In the known encoder, if the VBV buffer is likely to underflow, then the number of bits used is controlled by changing the quantization step sizes for the macroblocks within the picture being encoded.

This control technique is hard to apply to a small-sized picture, i.e., a picture composed of a relatively small number of pixels, as is often subjected to MPEG-1 processing. This is because the number of macroblocks per picture is also small in that case. For example, 1620 macroblocks are included in a picture of a size of 720×576 pixels, while only 396 macroblocks are included in a picture of a size of 352×288 pixels. Accordingly, an excessive number of bits should be used to encode each picture, thus often causing the VBV buffer to underflow.

SUMMARY OF THE INVENTION

An object of the invention is providing an encoder apparatus that re-encodes pictures if necessary and if there is enough time for the apparatus to do the encoding such that all of the encoded data can be transmitted without missing any part of it.

An inventive encoder apparatus includes: an encoder for compressing and encoding multiple moving pictures and calculating the number of bits used to obtain encoded data by encoding each said picture to be encoded; original picture data storage for storing the pictures to be encoded thereon; encoded data storage for storing the encoded data thereon; and a bit number comparator for obtaining a threshold value of the number of bits available for each said picture to be encoded and determining whether or not the bit number exceeds the threshold value. If the encoder has determined that there will be enough time for the encoder to re-encode a current one of the pictures to be encoded before encoding of a next one of the pictures is started and if the comparator has found the bit number exceeding the threshold value, then the encoder re-encodes the current picture by changing encoding parameters in such a manner as to reduce the bit number.

According to the present invention, if there is enough time for the encoder to re-encode the current picture, then the number of bits used to encode the picture is reduced so as not to exceed the threshold value.

In one embodiment of the present invention, the threshold value is a number of bits that is defined to prevent a video buffering verifier (VBV) buffer from underflowing.

In such an embodiment, the number of bits is controllable in such a manner as to prevent the VBV buffer from underflowing, or to make the encoded data, output from the encoder apparatus, meet a bit number constraint.

In another embodiment of the present invention, the encoder performs variable-length encoding on the moving pictures.

In such an embodiment, the number of bits can be reduced easily by changing encoding parameters.

In still another embodiment, each said encoding parameter is changed to increase a quantization step size.

In this manner, the number of bits can be reduced just as intended so as not to exceed the threshold value.

In yet another embodiment, the inventive apparatus encodes the moving pictures in real time such that encoding of each said picture is completed within a time interval defined for the moving pictures.

In such an embodiment, the number of bits can be reduced if necessary to encode the pictures in real time.

In this particular embodiment, the encoder is allowed to re-encode the current picture to be encoded if the number of pixels included in the current picture is equal to or less than half of a maximum number of pixels that the encoder can process within the time interval.

In such an embodiment, a picture, composed of a small number of pixels, is selectively re-encoded. Thus, the number of bits used to encode the picture can be reduced.

In an alternative embodiment, the inventive apparatus further includes a counter for counting the number of times the encoder has encoded the current picture. If the number of pixels included in the current picture is equal to or less than 1/N (where N is an integer equal to or greater than three) of a maximum number of pixels that the encoder can process within the time interval and if the counter indicates that the current picture has been encoded less than N times, then the encoder is allowed to re-encode the current picture.

In such an embodiment, the encoding parameters can be changed little by little, and therefore, degradation in image quality, resulting from the reduction in number of bits used, can be minimized.

In this particular embodiment, the encoding parameters are changed such that a quantization step size is gradually increased until the current picture has been encoded N−1 times and that the quantization step size is maximized within an allowable range when the current picture is encoded for the $N^{th}$ time.

In this manner, the degradation in image quality can be minimized while preventing the bit number from exceeding the threshold value.

In yet another embodiment, the encoder begins encoding by encoding one of the pictures that is to be encoded first a number of times.

In this manner, the picture to be encoded first can have its image quality improved while preventing the bit number from exceeding the threshold value.

In yet another embodiment, the encoder ends encoding by re-encoding one of the pictures that has been encoded last.

In this manner, the picture that has been encoded last can have its image quality improved while preventing the bit number from exceeding the threshold value.

An inventive encoding method includes the steps of: a) compressing and encoding multiple moving pictures; b) calculating the number of bits used to obtain encoded data by encoding each said picture to be encoded; c) obtaining a threshold value of the number of bits available for each said picture to be encoded; and d) determining whether or not the bit number exceeds the threshold value. If there is enough time to re-encode a current one of the pictures to be encoded before encoding of a next one of the pictures is started and if the bit number has been found exceeding the threshold value, then the current picture is re-encoded in the step a) by changing encoding parameters in such a manner as to reduce the bit number.

According to the present invention, if there is enough time to re-encode the current picture, then the number of bits used to encode the picture is reduced so as not to exceed the threshold value.

BRIEF DESCRIPTION OF THE DRAWINGS

FIG. 9 illustrates an example in which re-encoding is performed at the beginning of an encoding process.

FIG. 10 illustrates an example in which re-encoding is performed at the end of an encoding process.

DESCRIPTION OF THE PREFERRED EMBODIMENTS

Hereinafter, an encoder apparatus according to a preferred embodiment of the present invention will be described with reference to the accompanying drawings. In the following illustrative embodiment, the present invention will be described as being applied to encoding a frame picture, i.e., a picture with a frame structure.

Figure 1:
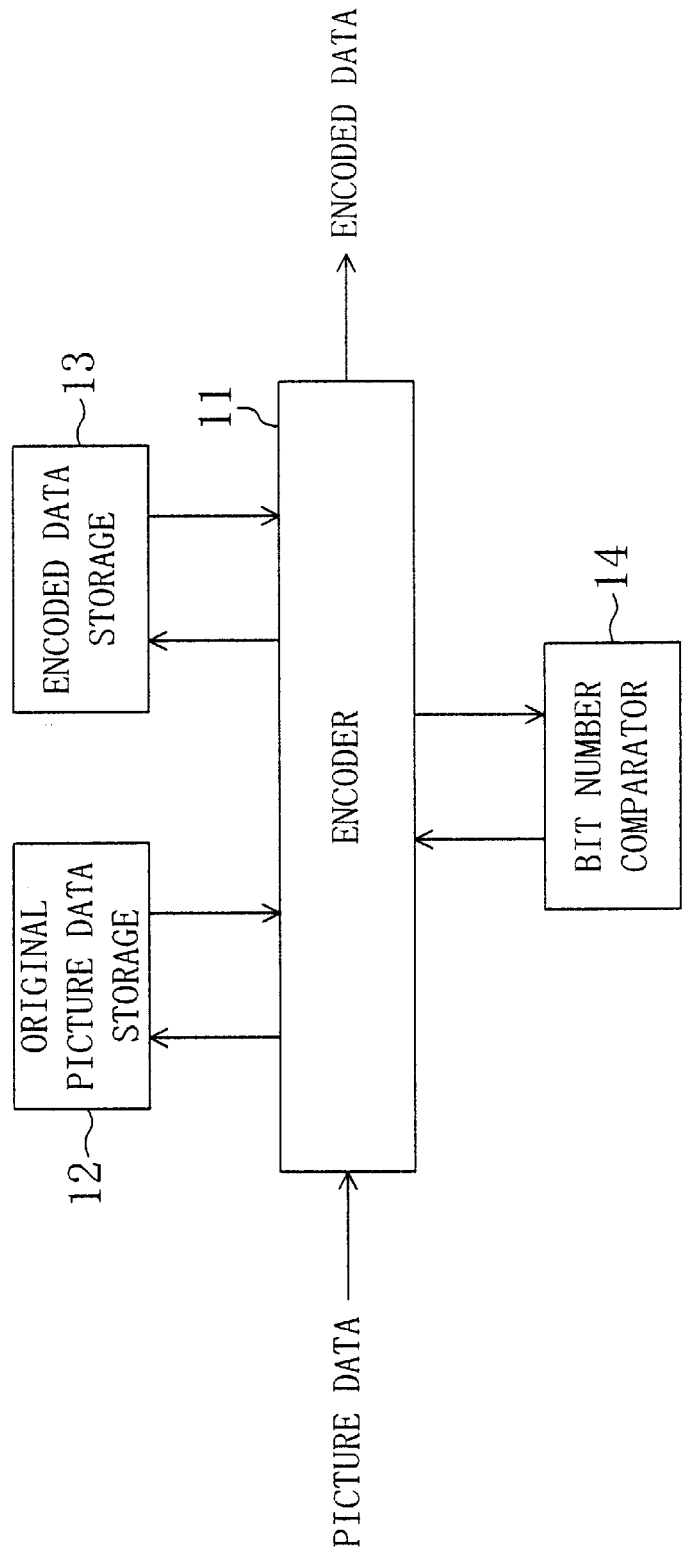
FIG. 1 is a block diagram illustrating a configuration for an encoder apparatus according to an embodiment of the present invention.

FIG. 1 is a block diagram illustrating a configuration for an encoder apparatus according to an embodiment of the present invention. As shown in FIG. 1, the apparatus includes encoder 11, original picture data storage 12, encoded data storage 13 and bit number comparator 14.

The encoder 11 receives externally input pictures to be encoded one by one, and outputs these pictures to the original picture data storage 12 as they are. In response, the original picture data storage 12 stores the input picture data thereon. The encoder 11 also reads out the picture data from the original picture data storage 12, compresses and encodes the data in compliance with an MPEG standard, for example, and then outputs the resultant encoded data to the encoded data storage 13. In addition, the encoder 11 calculates the number of bits used to encode the picture data and outputs the number to the bit number comparator 14. In the illustrated embodiment, the encoder 11 compresses and encodes the picture by performing a discrete cosine transform (DCT) on the picture on an 8×8 pixel block basis and then variable-length-encoding the resultant DCT coefficients.

The encoded data storage 13 stores the input encoded data thereon and outputs it to the encoder 11 if necessary. The bit number comparator 14 obtains a threshold value of the number of bits available for each picture and compares the given bit number to its associated threshold value. If the comparator 14 has found the number exceeding its threshold value, then the comparator 14 outputs a signal requesting the encoder 11 to change encoding parameters. In this case, the threshold value is a number of bits that is so defined as to prevent the VBV buffer from underflowing. Normally, the threshold value is equal to the maximum value of such a number.

On receiving the request that the encoding parameters should be changed, the encoder 11 changes the encoding parameters in such a manner as to reduce the bit number. Then, the encoder 11 reads out an original picture, which the encoder 11 has already encoded and output to the encoded data storage 13, from the original picture data storage 12 again, re-encodes the picture and then outputs the encoded data to the encoded data storage 13. In response, the encoded data storage 13 stores the input encoded data thereon. Then, the encoder 11 reads out the encoded data from the encoded data storage 13 and outputs it to an external unit.

The encoder 11 shown in FIG. 1 can encode a picture of a size of 720×576 pixels in real time in compliance with the MPEG-2 standard, and can also encode a picture of a size smaller than 720×576 pixels. Furthermore, the encoder 11 may encodes a picture in accordance with the MPEG-1 standard. In the following illustrative embodiment, the encoder 11 shown in FIG. 1 will encode a picture of a size of 352×288 pixels in accordance with the MPEG-1. Thus, in the following example, the number of pixels included in a picture to be encoded is less than half of the maximum number of pixels that the encoder 11 can process within a prescribed amount of time.

Figure 2:
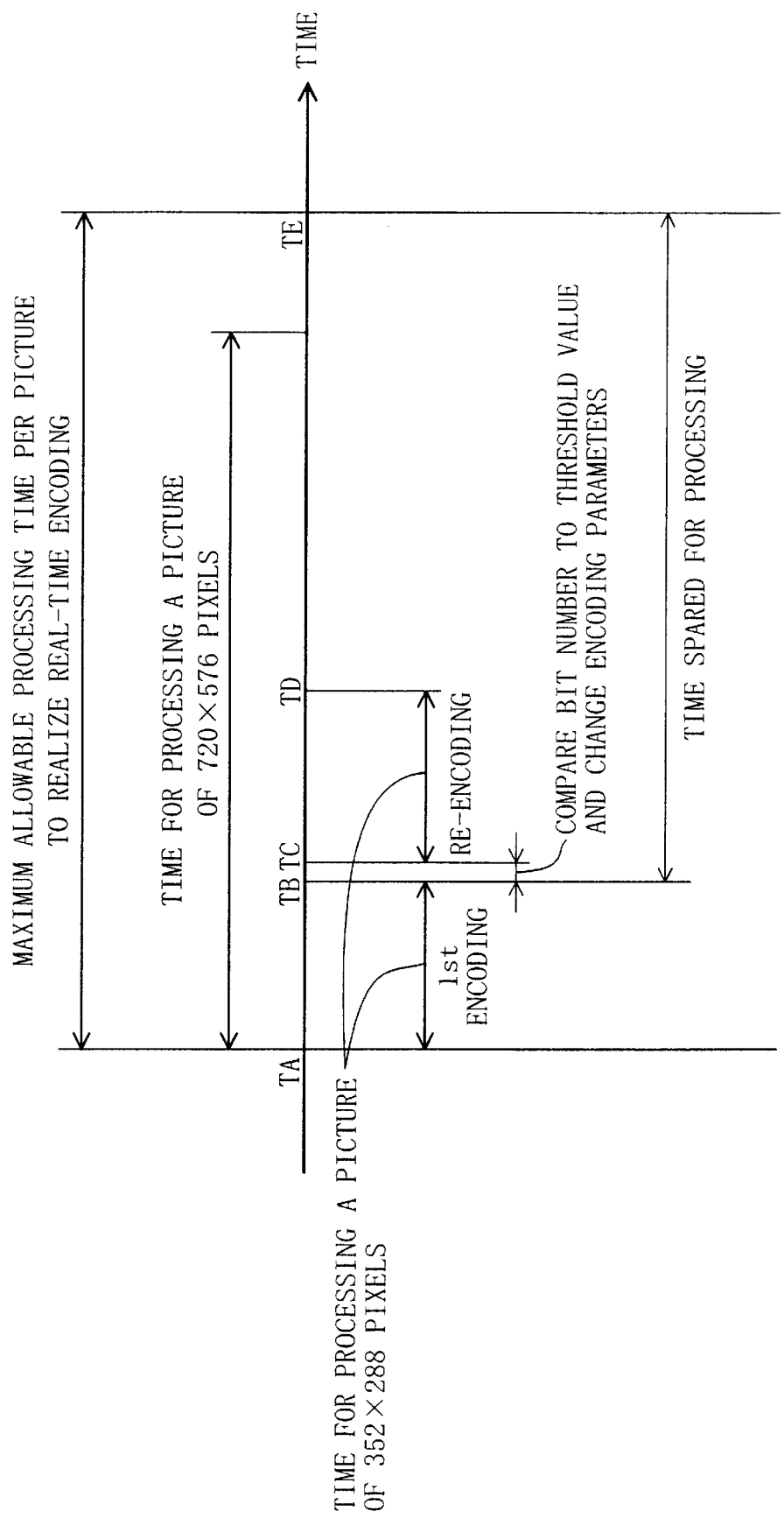
FIG. 2 is a timing diagram illustrating how the apparatus shown in FIG. 1 operates.

FIG. 2 is a timing diagram illustrating how the apparatus shown in FIG. 1 operates. In FIG. 2, the apparatus starts processing a picture of the size of 352×288 pixels at a time TA, and finishes a first encoding process of the picture at a time TB. Then, the apparatus starts re-encoding the picture at a time TC and finishes the re-encoding process at a time TD. And TE indicates a time limit by which the apparatus should complete processing the picture to realize real-time encoding. The interval between the times TB and TC is provided for comparing the number of bits used to the threshold value and for changing encoding parameters. The encoder apparatus shown in FIG. 1 can finish encoding a picture of the size of 720×576 pixels within an interval between the times TA and TE, which is equal to one frame interval (e.g., 1/30 second) defined for the moving pictures input to the encoder 11.

Generally speaking, an encoder can finish encoding a picture of a relatively small size (i.e., composed of a small number of pixels) in a shorter time, compared to a picture of a maximum size (i.e., composed of a maximum number of pixels that the encoder can process within a prescribed time). For example, suppose an encoder should encode a picture of a size of 352×288 pixels. In that case, the encoder can finish encoding the picture in less than ¼ of the time needed for the encoder to encode a picture of a size of 720×576 pixels by the same encoding method. It should be noted that this processing time is calculated based on a simple comparison between the numbers of pixels. Also, if an encoding method like the MPEG-1, which allows for encoding with a computational complexity lower than that required by the MPEG-2, is adopted, then the encoder can finish the encoding process in an even shorter amount of time.

Accordingly, even if the encoder 11 shown in FIG. 1 should encode the picture of the size of 352×288 pixels in real time in accordance with the MPEG-1, there is still plenty of time for the encoder 11 to finish the process by the time limit. That is to say, the encoder 11 can finish the encoding process once in the interval between the times TA and TB and the remaining interval between the times TB and TE is a time spared for the encoder 11 as shown in FIG. 2. Thus, there is enough time for the encoder 11 to encode the same picture again within this interval.

Figure 3:
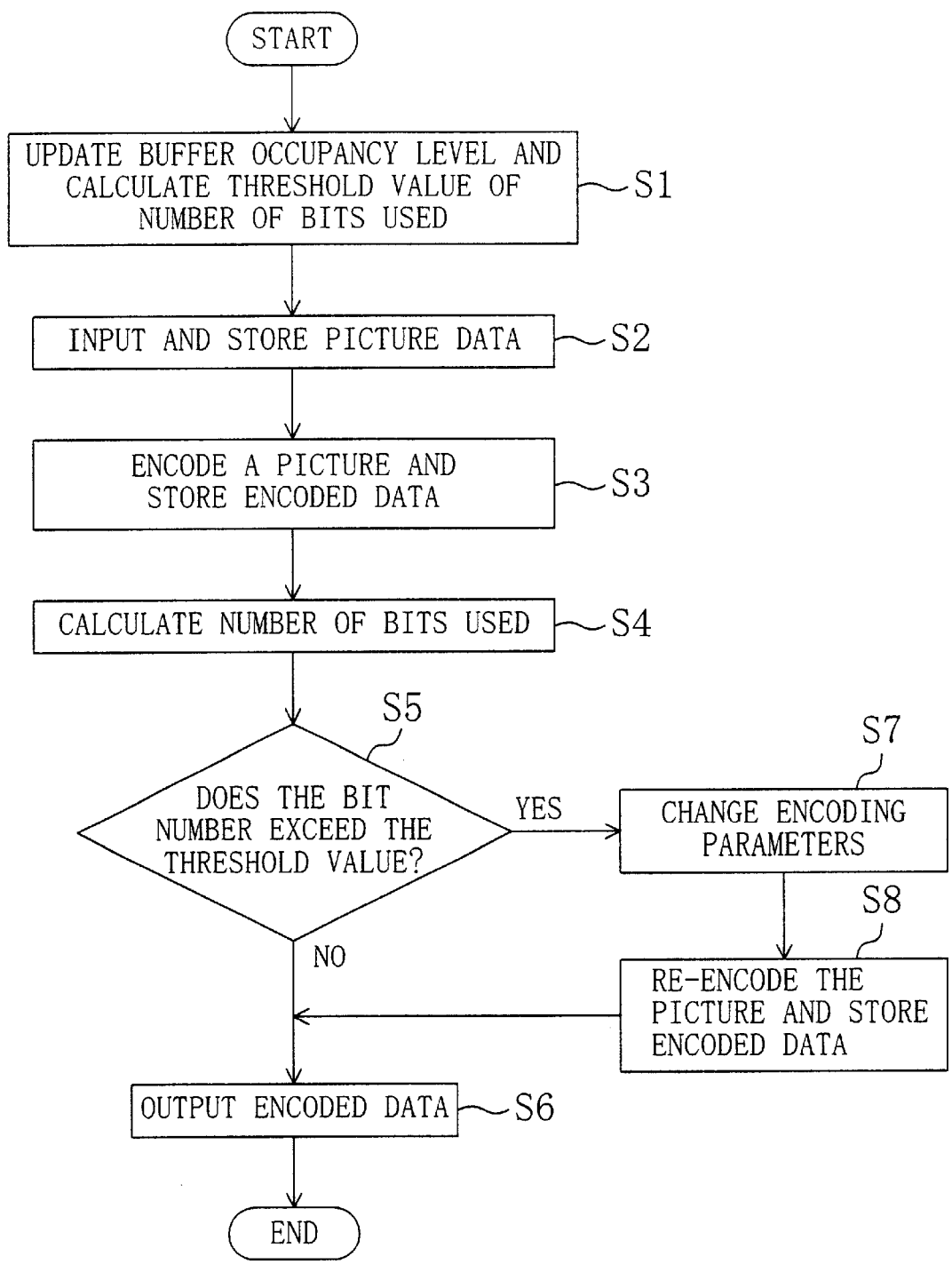
FIG. 3 is a flowchart illustrating respective process steps through which the apparatus shown in FIG. 1 encodes a picture.

FIG. 3 is a flowchart illustrating respective process steps through which the apparatus shown in FIG. 1 encodes a picture. Hereinafter, it will be described with reference to FIGS. 1 through 3 how the apparatus shown in FIG. 1 operates. In the illustrated embodiment, the encoder 11 already knows from an encoding parameter (input along with the picture data) that the number of pixels in the input picture is 352×288, which is less than half of the number of pixels in a picture of the maximum size. That is to say, the encoder 11 has already determined that it will be possible to re-encode the picture.

As shown in FIG. 3, in Step S1, the bit number comparator 14 calculates a maximum number of bits that can be used to encode a picture, below which the VBV buffer will not underflow. The comparator 14 calculates this number from the occupancy level of the VBV buffer, the rate at which the encoded data is input to the VBV buffer and the time left before decoding of the next picture is started. Then, the comparator 14 stores this calculated number as a threshold value of the number of bits used.

Next, in Step S2, data of a picture to be encoded is externally input to the encoder 11, which outputs the picture data as it is to the original picture data storage 12. In response, the original picture data storage 12 stores the input picture data thereon.

Then, in Step S3, the encoder 11 reads out the picture to be encoded and picture data needed for predictive encoding from the original picture data storage 12, performs the first encoding process on the picture and then outputs the resultant encoded data to the encoded data storage 13 within the interval between TA and TB shown in FIG. 2. In response, the encoded data storage 13 stores the input encoded data thereon.

Subsequently, in Step S4, the encoder 11 calculates the number of bits used and outputs the number to the bit number comparator 14.

Next, in Step S5, the bit number comparator 14 compares the input bit number to the threshold value obtained in Step S1. If the comparator 14 has not found the number exceeding the threshold value, then the process advances to Step S6. Otherwise, i.e., if the comparator 14 expects that the VBV buffer is likely to underflow, then the process advances to Step S7.

In Step S6, the encoder 11 reads out the definitive encoded data from the encoded data storage 13 and outputs the data to an external unit at the time TE shown in FIG. 2. In this manner, an encoding process of a picture is completed.

On the other hand, in Step S7, the bit number comparator 14 outputs a signal requesting the encoder 11 to change the encoding parameters such that the bit number can be reduced in the interval between TB and TC shown in FIG. 2. At this request, the encoder 11 changes the encoding parameters.

Next, in Step S8, the encoder 11 re-encodes the same picture as that encoded during the first encoding process (in the interval between TC and TD shown in FIG. 2). Then, the encoder 11 outputs the encoded data, resulting from the re-encoding, to the encoded data storage 13, which stores the data thereon by overwriting the previous encoded data, obtained during the first encoding process, with the new data. Thereafter, the process advances to Step S6 to complete the encoding process of a picture.

Figure 4:
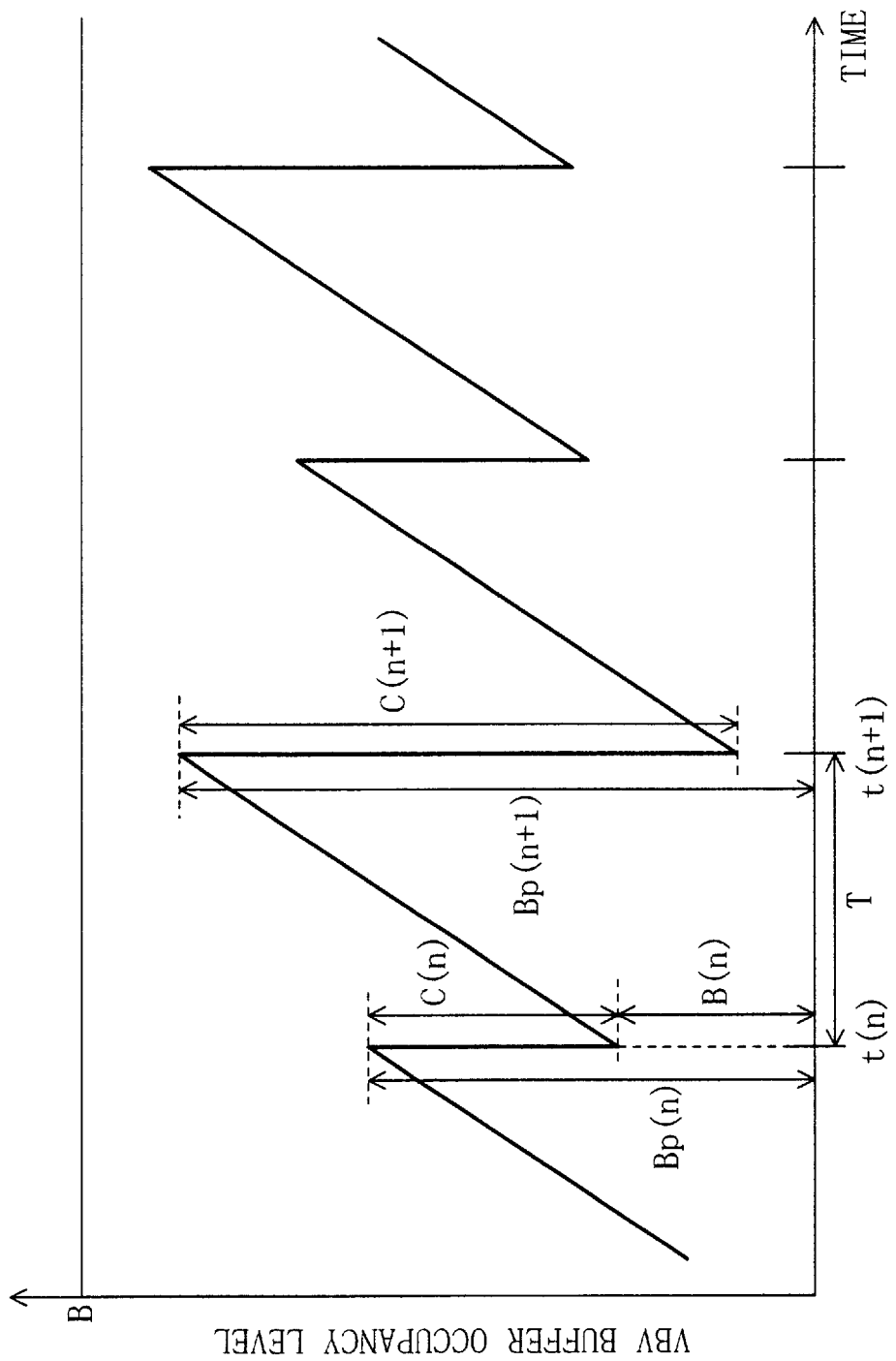
FIG. 4 is a graph illustrating a variation of the VBV buffer occupancy level as encoded data is input and output to/from the buffer with time.

Next, it will be described how to calculate the threshold value in Step S1 shown in FIG. 3. FIG. 4 is a graph illustrating a variation of the VBV buffer occupancy level as encoded data is input and output to/from the buffer with time. In FIG. 4, the ordinate represents the VBV buffer occupancy level, the abscissa represents the time and B is a capacity of the VBV buffer.

Suppose C(n) represents the number of bits used to encode a previous picture that was encoded just before a current picture to be encoded and Bp(n) represents the occupancy level of the VBV buffer just before the previous picture is decoded. In this case, the previous picture is decoded instantaneously at a time t(n) and the occupancy level B(n) of the VBV buffer just after the encoded data of the previous picture has been removed instantaneously is given by $$B(n)=Bp(n)-C(n)$$

Suppose T [seconds] represents an interval at which pictures are decoded and R [bits per second] is a constant rate at which the data is input to the VBV buffer. In that case, the occupancy level Bp(n+1) of the VBV buffer at a time t(n+1), at which the current picture is supposed to be decoded but has not been decoded yet, is given by $$Bp(n+1)=B(n)+RT$$

where T=t(n+1)−t(n).

If the number C(n+1) of bits used to encode the current picture is greater than the occupancy level Bp(n+1) of the VBV buffer, then not all of the encoded data of the current picture, which should be decoded at the time t(n+1), can be prepared, thus causing the VBV buffer to underflow. Accordingly, the occupancy level Bp(n+1) of the VBV buffer is defined as a threshold value of the number of bits usable to encode the current picture.

In Step S7 shown in FIG. 3, the encoding parameters are changed. For example, the quantization step size, one of the parameters, may be increased. In the illustrated embodiment, the quantization step size is maximized within the allowable range to prevent the VBV buffer from underflowing by reducing the bit number just as intended. However, the quantization step size redefined for re-encoding does not have to be maximized but may be any other value greater than that defined for the first encoding process.

If the quantization step size is increased, then the number of DCT coefficients with a zero value increases. In that case, the bit number can be reduced since the encoder 11 can variable-length encode the DCT coefficients.

Figure 5:
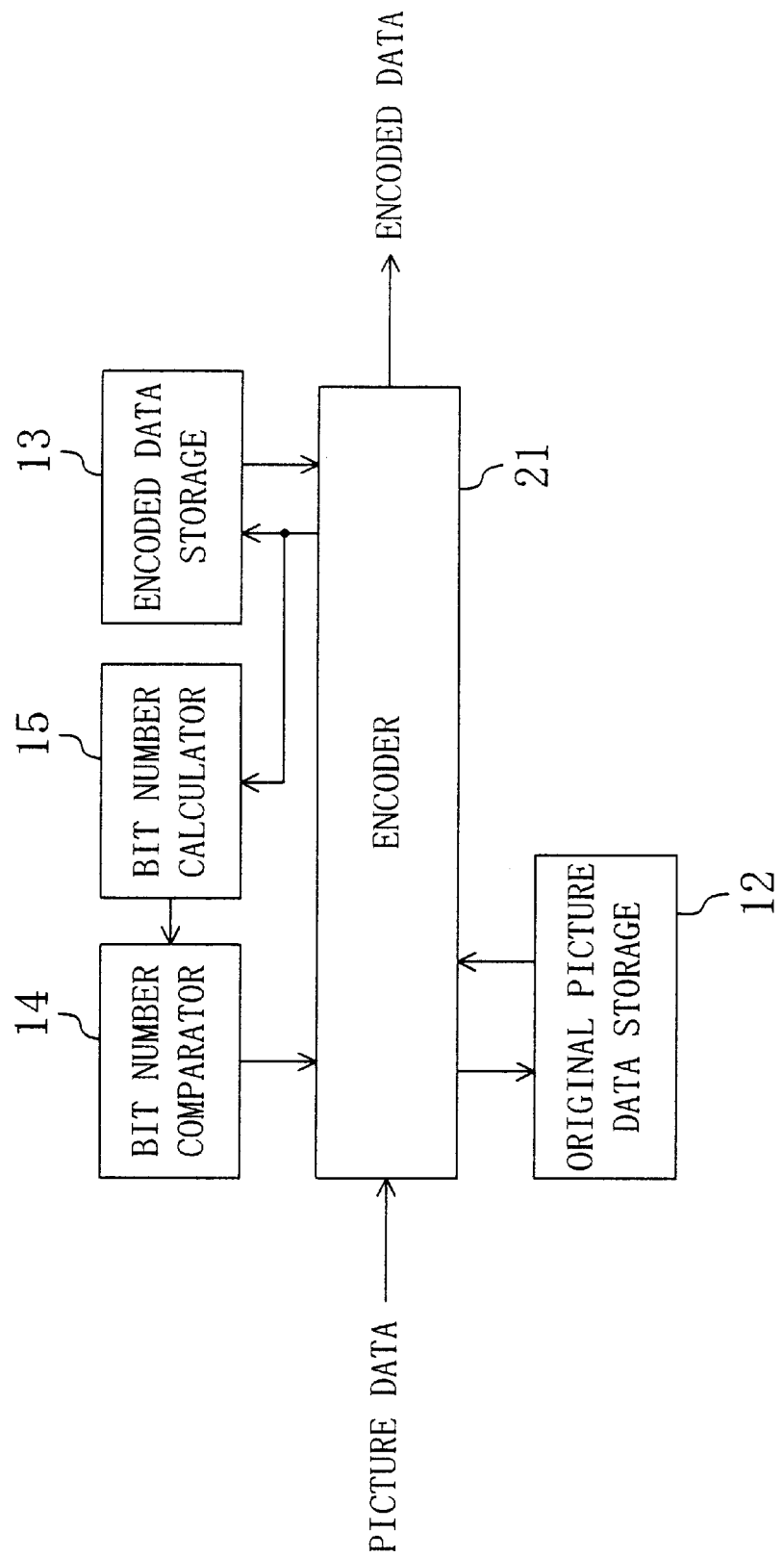
FIG. 5 is a block diagram illustrating an alternative configuration for the apparatus shown in FIG. 1.

FIG. 5 is a block diagram illustrating an alternative configuration for the apparatus shown in FIG. 1. As shown in FIG. 5, this alternative encoder apparatus includes encoder 21, original picture data storage 12, encoded data storage 13, bit number comparator 14 and bit number calculator 15.

The original picture data storage 12, encoded data storage 13 and bit number comparator 14 are the same as the counterparts illustrated in FIG. 1. The encoder 21 operates in the same way as the encoder 11 shown in FIG. 1 except that the encoder 21 does not calculate the number of bits used. Receiving the encoded data from the encoder 21, the bit number calculator 15 calculates the number of bits of the input encoded data and then outputs the calculated number to the bit number comparator 14. Thus, the encoder apparatus shown in FIG. 5 can also operate in the same way as the counterpart illustrated in FIG. 1.

The bit number calculator 15 may obtain the threshold value of the bit number instead of the bit number comparator 14.

In this manner, the apparatus of this embodiment can encode an input picture in real time without causing the VBV buffer to underflow if the size of the picture is smaller than a maximum processable picture size and if there is enough time for the apparatus to re-encode the picture.

MODIFIED EXAMPLE

In the foregoing embodiment, the re-encoding process is supposed to be performed just once, but may be performed several times. Hereinafter, a modified example, in which the re-encoding process is repeated numerous times, will be described.

Figure 6:
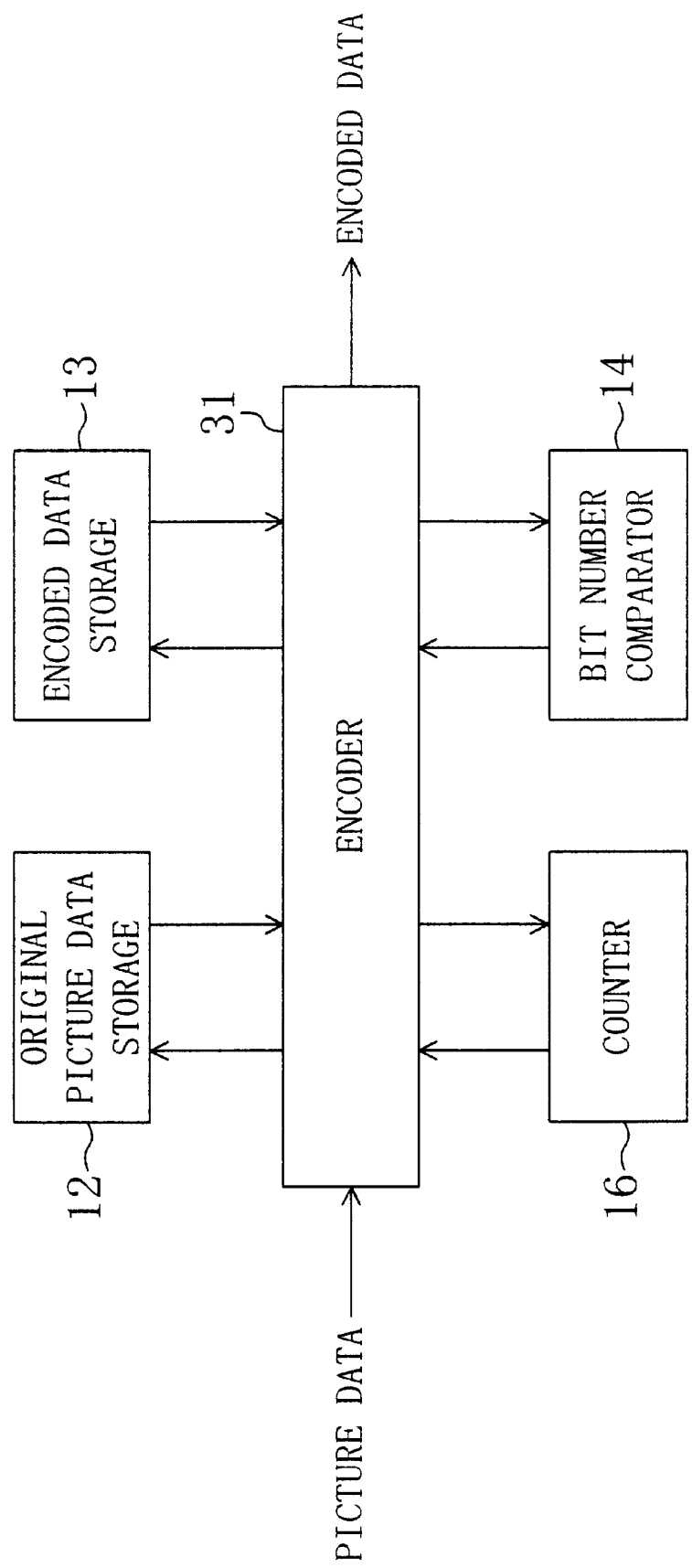
FIG. 6 is a block diagram illustrating a configuration for an encoder apparatus according to a modified example of the embodiment of the present invention.

FIG. 6 is a block diagram illustrating a configuration for an encoder apparatus according to a modified example of the embodiment of the present invention. As shown in FIG. 6, the apparatus includes encoder 31, original picture data storage 12, encoded data storage 13, bit number comparator 14 and counter 16. The original picture data storage 12, encoded data storage 13 and bit number comparator 14 are the same as the counterparts illustrated in FIG. 1, and are identified by the same reference numerals. Thus, the description thereof will be omitted herein.

The encoder 31 shown in FIG. 6 can encode a picture composed of a number M of pixels in real time in accordance with the MPEG-2. In the following illustrative example, the encoder apparatus shown in FIG. 6 is supposed to encode a picture composed of a number M/N of pixels (where each of M and N is an integer equal to or greater than three) in accordance with the MPEG-1. In that case, the same picture can be repeatedly encoded N times in real time.

Every time the encoder 31 finishes an encoding process, the counter 16 receives an end-of-encoding signal from the encoder 31. Based on this signal, the counter 16 counts the number of times the same picture has been repeatedly encoded and informs the encoder 31 of this number of times.

If the encoder 31 receives a signal, requesting that the encoding parameters be changed, from the bit number comparator 14 before the number of times of encoding reaches N, then the encoder 31 changes the encoding parameters and then performs re-encoding. However, the encoder 31 changes the encoding parameters differently from the encoder 11 shown in FIG. 1. Specifically, the encoder 31 changes the encoding parameters in such a manner as to gradually reduce the number of bits used for the $2^{nd}$ to $(N-1)^{th}$ encoding processes and to reduce the number as much as possible for the $N^{th}$ encoding process.

Figure 7:
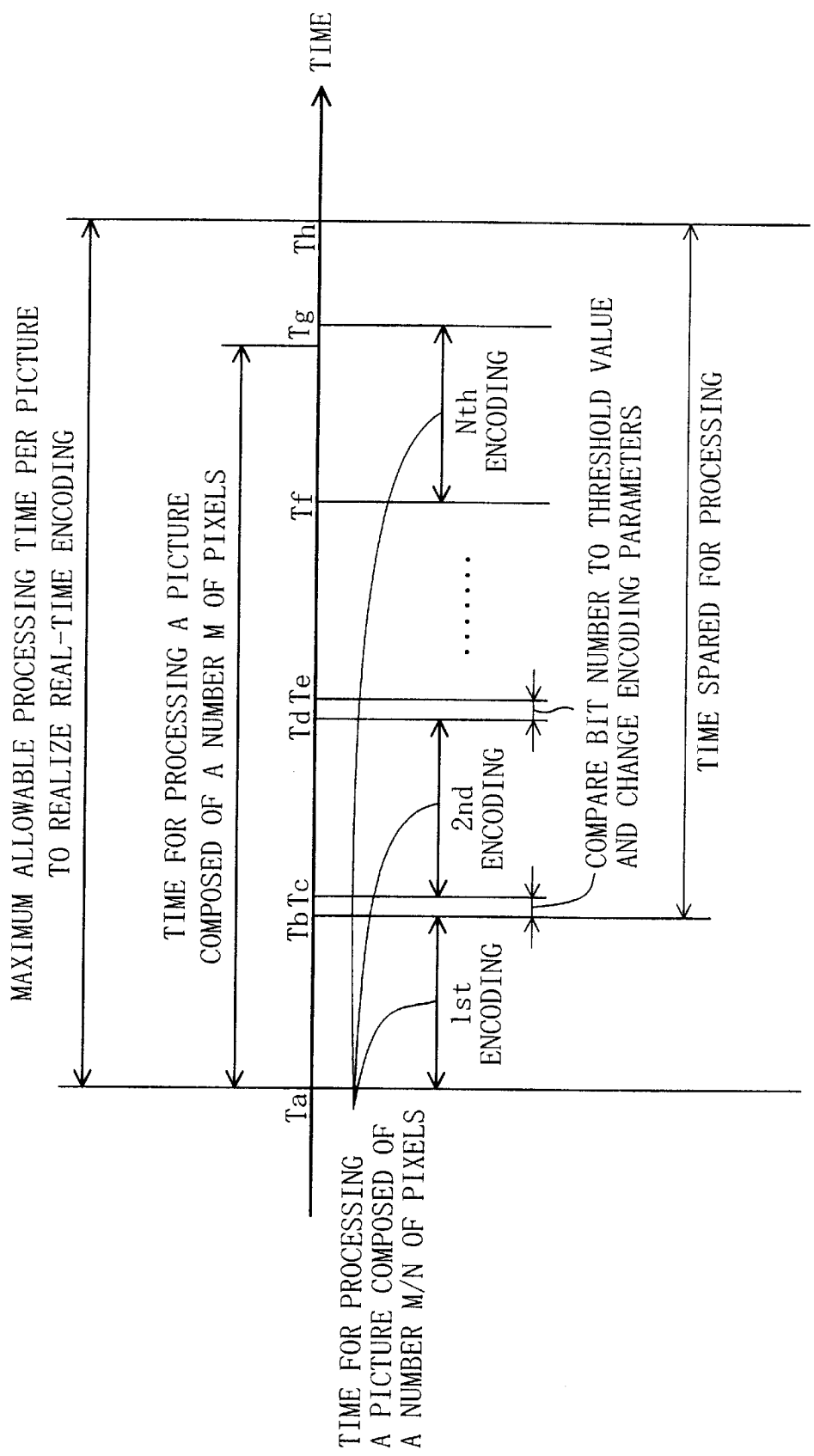
FIG. 7 is a timing diagram illustrating how the apparatus shown in FIG. 6 re-encodes a picture, composed of a number M/N of pixels, N times.

FIG. 7 is a timing diagram illustrating how the apparatus shown in FIG. 6 re-encodes a picture composed of a number M/N of pixels N times.

In FIG. 7, the encoder apparatus starts processing the picture at a time Ta, and finishes a $1^{st}$ encoding process of the picture at a time Tb. Then, the apparatus starts a $2^{nd}$ encoding process at a time Tc and finishes the $2^{nd}$ encoding process at a time Td. Thereafter, the apparatus starts a $3^{rd}$ encoding process at a time Te. Finally, the apparatus starts an $N^{th}$ encoding process at a time Tf and finishes the $N^{th}$ encoding process at a time Tg. And Th indicates a time limit by which the apparatus should complete processing the picture to realize real-time encoding. The interval between the times Tb and Tc and the interval between the times Td and Te are provided for comparing the bit number to the threshold value and for changing encoding parameters. The encoder apparatus shown in FIG. 6 can finish encoding a picture, composed of a number M of pixels, within an interval between the times Ta and Th.

Figure 8:
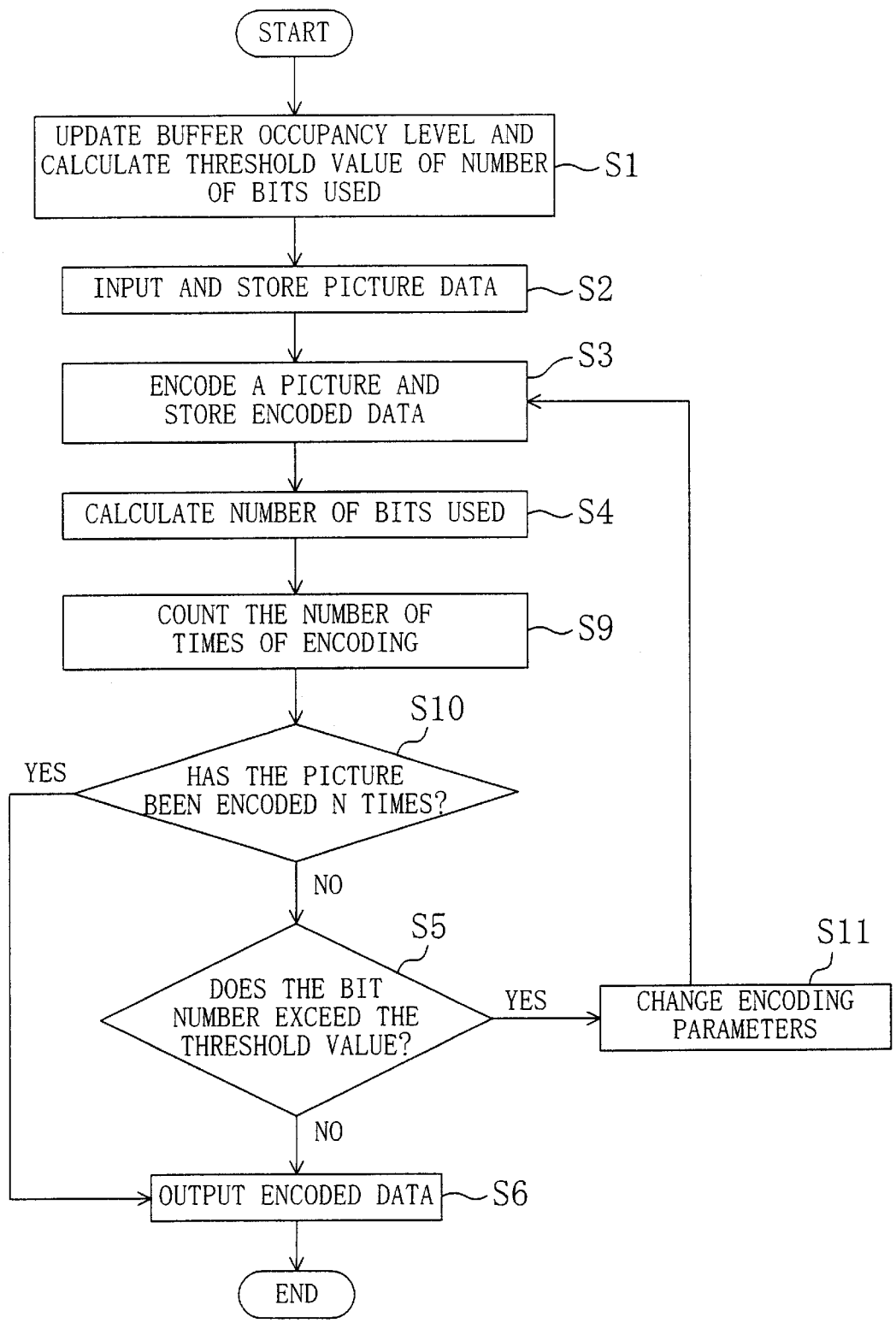
FIG. 8 is a flowchart illustrating respective process steps through which the apparatus shown in FIG. 6 encodes a picture by re-encoding it several times.

FIG. 8 is a flowchart illustrating respective process steps through which the apparatus shown in FIG. 6 encodes a picture by re-encoding the same picture several times. In FIG. 8, Steps S1 through S6 are the same as the counter-parts illustrated in FIG. 3, and the description thereof will be omitted herein. In the illustrated embodiment, the encoder 31 already knows from an encoding parameter (input along with the picture data) that the number of pixels in the input picture is M/N, which is 1/N of the number of pixels in a picture of the maximum picture size. That is to say, the encoder 31 has already determined that it will be possible to encode the picture N times.

After the bit number has been calculated in Step S4, the counter 16 increments the count by one in Step S9 and informs the encoder 31 of the number of times the current picture has been encoded.

Next, in Step S10, the encoder 31 determines by the count whether or not the same picture has been encoded N times. If the answer is YES, the process jumps to Step S6, in which the encoder 31 outputs the encoded data to an external unit to complete the encoding process of the current picture. Alternatively, if the answer is NO, then the process advances to Step S5.

Next, in Step 5, the bit number comparator 14 compares the number of bits obtained in Step S4 to the threshold value. If the number does not exceed the threshold value, then the process advances to Step S6 to complete the encoding process of the current picture. Otherwise, i.e., if the number exceeds the threshold value, then the process advances to Step S11.

In Step S11, the bit number comparator 14 outputs a signal, requesting the encoder 31 to change the encoding parameters such that the bit number is reduced in the interval between Tb and Tc shown in FIG. 7, for example. At the request, the encoder 31 changes the encoding parameters. Then, the process returns to Step S3 to start the next re-encoding process.

In Step S11, the encoding parameters are changed. For example, the quantization step size, one of the parameters, may be increased. In the illustrated embodiment, the re-encoding process can be performed several times. Accordingly, considering the number N of times the same picture can be repeatedly encoded, the quantization step size is gradually increased little by little every time the re-encoding process is performed. However, in the last encoding process, i.e., $N^{th}$ encoding process, the quantization step size is maximized within the allowable range to prevent the VBV buffer from underflowing by reducing the bit number just as intended. However, the quantization step size for the $N^{th}$ encoding process does not have to be maximized but may be any other value greater than that defined for the $(N-1)^{th}$ encoding process.

In this modified example, even before the same picture has been encoded N times, if the bit number comparator 14 has determined in Step S5 that the bit number does not exceed the threshold value (i.e., if the VBV buffer will not underflow), then subsequent re-encoding is canceled. Accordingly, degradation in image quality can be suppressed without increasing the quantization step size more than necessary.

In the foregoing embodiment, the re-encoding process is performed if it is clear from the difference in number of pixels included between the input picture and the picture of the maximum size that there will be enough time for the re-encoding. However, this decision does not have to be made based on the difference in number of pixels. For example, every time the encoder has finished the encoding process, the encoder may determine whether or not there will be enough time for re-encoding by comparing the time needed for the encoding process to the time left before encoding of the next picture is started.

Hereinafter, another embodiment of the present invention, in which the re-encoding process is selectively performed based on the availability of the spare time, not the difference in number of pixels, will be described. In the following illustrative embodiment, the encoder apparatus shown in FIG. 1 is supposed to encode a picture of the maximum processable size in accordance with the MPEG-2.

First, it will be described how to re-encode an I-(intra coded) picture. The MPEG standards define the three types of pictures, namely, I-, P-(predictively coded) and B-(bidirectionally predictively coded) pictures. In encoding an I-picture, there is no need to perform motion estimation, motion compensation or any other processing requiring a high computational complexity. Thus, compared to encoding of a P- or B-picture, a shorter time is needed for processing an I-picture. In other words, it is no less possible to re-encode an I-picture of the maximum picture size than to re-encode a picture of a less-than-maximum size.

The encoder 11 determines whether or not there will be enough time for re-encoding by comparing the time needed for the encoding to the time left before encoding of the next picture is started. And the encoder 11 performs the re-encoding only if the answer is YES. Every time the encoding process is finished, the encoder 11 may make such a decision about whether or not the re-encoding can be performed.

In general, an I-picture needs a large number of bits since the picture of this type is intra-coded. Thus, the re-encoding will be very effective because the number of bits used often exceeds the threshold value obtained by the bit number comparator 14.

Next, it will be described how re-encoding may be performed at the beginning of an encoding process. In accordance with the MPEG, pictures are not encoded in the order in which those pictures have been input, and therefore, the input pictures should be rearranged. Accordingly, in the illustrated embodiment, re-encoding is performed using the time needed for the rearrangement.

FIG. 9 illustrates an example in which re-encoding is performed at the beginning of an encoding process. In FIG. 9, each rectangle represents a single picture. As shown in FIG. 9-(a), pictures are input to the encoder 11 in the order of I0, B1, B2, P3, B4, etc., where I, B and P represent the respective picture types.

FIG. 9-(b) illustrates the pictures stored on the original picture data storage 12. The original picture data storage 12 includes memories for use in rearranging the pictures. In the illustrated embodiment, the original picture data storage 12 includes memories corresponding to four frames. In FIG. 9-(b), E represents a vacancy, i.e., a state where no data should be stored on a frame memory.

A B-picture is encoded after a picture, which the B-picture refers to backward, has been encoded. Thus, the pictures, which have been input in the order shown in FIG. 9-(a), are encoded in the order of I0, P3, B1, B2, etc. as shown in FIG. 9-(c). In that case, the first picture I0 is normally encoded only once during the interval TSc just before the picture P3 is encoded.

However, since the picture I0 has already been input to the original picture data storage 12 three frame periods before the interval TSc, it is possible to start encoding the picture I0 at beginning of the interval TSa, which is two frame periods before the interval TSc. The encoding of the next picture P3 may be started after the interval TSc is over. Accordingly, the encoder 11 determines that there will be enough time for re-encoding when the interval TSa is over and when the interval TSb is over. In that case, the encoder 11 re-encodes the picture I0 twice in the intervals TSb and TSc as shown in FIG. 9-(d).

Generally speaking, a quantization step size is determined depending on the history of pictures that were encoded in the past. However, since such a history is not available at the beginning of an encoding process, the quantization step size cannot be set at an appropriate value. Accordingly, when the picture I0 is encoded for the first time at the beginning of the interval TSa, the quantization step size is set at a minimum permissible value of "1".

In this case, if the number of bits used is not large enough to cause the VBV buffer to underflow, then the resultant encoded data is output as it is. On the other hand, if the bit number is so large that the VBV buffer is likely to underflow, then the number can be reduced by performing the re-encoding process with the quantization step size increased.

In general, since no information on the past encoding is usually available at the beginning of an encoding process, it is difficult to attain an appropriate image quality. However, in this example, even if a picture of a maximum size has been encoded at the beginning of an encoding process, that picture can also be re-encoded. Thus, a picture to be encoded first can have its image quality improved within a limited range of the number of bits available without causing the VBV buffer to underflow.

Next, it will be described how re-encoding may be performed at the end of an encoding process.

FIG. 10 illustrates an example in which re-encoding is performed at the end of an encoding process. FIG. 10 illustrates the input pictures starting with P6 shown in FIG. 9. In the illustrated embodiment, the encoding process is once suspended when encoding of the input picture P9 is completed. No pictures are input during the succeeding three frame periods. And then the encoding process is re-started on the input pictures starting with B10.

Like FIG. 9-(b), FIG. 10-(b) also illustrates the pictures stored on the original picture data storage 12. The pictures, which have been input in the order shown in FIG. 10-(a), are encoded in the order of P9, B7, B8, etc. as shown in FIG. 10-(c). In that case, the last picture B8 is normally encoded only once during the interval TEa.

However, the encoding of the next picture I12, which is the first one to be encoded when the encoding process is resumed, does not have to be started until the interval TEd is over. Accordingly, the encoder 11 determines that there will be enough time for re-encoding when the interval TEa is over, when TEb is over and when TEc is over. In that case, the encoder 11 re-encodes the picture B8 three times in the intervals TEb, TEc and TEd as shown in FIG. 10-(d).

In this case, the quantization step size is also set at a minimum permissible value of "1" when the picture B8 is encoded for the first time at the beginning of the interval TEa. If the number of bits used is not large enough to cause the VBV buffer to underflow, then the resultant encoded data is output as it is. On the other hand, if the bit number is so large that the VBV buffer is likely to underflow, then the number can be reduced by performing the re-encoding process with the quantization step size increased.

In general, when an encoding process should end, the last picture does not have to be encoded in real time. Accordingly, even if a picture of a maximum size has to be encoded at the end of an encoding process, that picture can also be re-encoded. Thus, a picture to be encoded last can have its image quality improved within a limited range of the number of bits available without causing the VBV buffer to underflow.

In the foregoing embodiments, a picture with a frame structure is supposed to be encoded. Alternatively, the present invention is also applicable to encoding a picture with a field structure.

Also, in the foregoing embodiments, a picture is supposed to be encoded in compliance with the MPEG-1 or MPEG-2 using an encoder that can compress and encode the picture by the MPEG-2. However, a picture may be encoded in compliance with any other video compression standard using an encoder that can compress and encode the picture by any other technique.

Furthermore, the quantization step size does not have to be as defined in the foregoing embodiments. It is only necessary that the quantization step size applied to re-encoding of a picture is greater than that applied to the picture previously.

As described above, if a picture to be encoded requires a computational complexity lower than the maximum complexity imposed on an encoder to realize real-time processing (e.g., a picture smaller in size than a picture of a maximum processable size), the VBV buffer will not underflow according to the present invention. Thus, the inventive encoder can transmit resultant encoded data in its entirety and encode a picture in real time. And when the encoded data is decoded, no part (e.g., frame) of the data is missed.

What is claimed is:

1. An encoder apparatus comprising:
   an encoder for compressing and encoding multiple moving pictures and calculating the number of bits used to obtain encoded data by encoding each said picture to be encoded;
   original picture data storage for storing the pictures to be encoded thereon;
   encoded data storage for storing the encoded data thereon; and
   a bit number comparator for obtaining a threshold value of the number of bits available for each said picture to be encoded and determining whether or not the bit number exceeds the threshold value,
   wherein if the encoder has determined that there will be enough time for the encoder to re-encode a current one of the pictures to be encoded before encoding of a next one of the pictures is started and
   if the comparator has found the bit number exceeding the threshold value, then
      the encoder re-encodes the current picture by changing encoding parameters in such a manner as to reduce the bit number.

2. The apparatus of claim 1, wherein the threshold value is a number of bits that is defined to prevent a video buffering verifier (VBV) buffer from underflowing.

3. The apparatus of claim 1, wherein the encoder performs variable-length encoding on the moving pictures.

4. The apparatus of claim 1, wherein each said encoding parameter is changed to increase a quantization step size.

5. The apparatus of claim 1, which encodes the moving pictures in real time such that encoding of each said picture is completed within a time interval defined for the moving pictures.

6. The apparatus of claim 5, wherein the encoder is allowed to re-encode the current picture to be encoded if the number of pixels included in the current picture is equal to or less than half of a maximum number of pixels that the encoder can process within the time interval.

7. The apparatus of claim 5, further comprising a counter for counting the number of times the encoder has encoded the current picture,
   wherein if the number of pixels included in the current picture is equal to or less than 1/N (where N is an integer equal to or greater than three) of a maximum number of pixels that the encoder can process within the time interval, and
   if the counter indicates that the current picture has been encoded less than N times, then
      the encoder is allowed to re-encode the current picture.

8. The apparatus of claim 7, wherein the encoding parameters are changed such that a quantization step size is gradually increased until the current picture has been encoded N−1 times, and that the quantization step size is maximized within an allowable range when the current picture is encoded for the $N^{th}$ time.

9. The apparatus of claim 1, wherein the encoder begins encoding by encoding one of the pictures that is to be encoded first a number of times.

10. The apparatus of claim 1, wherein the encoder ends encoding by re-encoding one of the pictures that has been encoded last.

11. An encoding method comprising the steps of:
   a) compressing and encoding multiple moving pictures;
   b) calculating the number of bits used to obtain encoded data by encoding each said picture to be encoded;

c) obtaining a threshold value of the number of bits available for each said picture to be encoded; and d) determining whether or not the bit number exceeds the threshold value, wherein if there is enough time to re-encode a current one of the pictures to be encoded before encoding of a next one of the pictures is started and if the bit number has been found exceeding the threshold value, then the current picture is re-encoded in the step a) by changing encoding parameters in such a manner as to reduce the bit number.

\* \* \* \* \*